United States Patent
Dangremond et al.

[11] 3,768,953
[45] Oct. 30, 1973

[54] CLAMPING APPARATUS FOR MOLDING MACHINE

[75] Inventors: Rodger L. Dangremond, Holland; Donald L. Reuschel, Zeeland, both of Mich.

[73] Assignee: Ex-Cell-O Corporation, Detroit, Mich.

[22] Filed: Nov. 11, 1971

[21] Appl. No.: 197,694

[52] U.S. Cl. 425/450, 425/DIG. 221, 425/DIG. 223
[58] Field of Search.................. B29f/1/00; 425/450, 425/242, 168, DIG. 221, DIG. 223, 167

[56] References Cited
UNITED STATES PATENTS

| | | | |
|---|---|---|---|
| 2,718,663 | 9/1955 | Roger | 425/450 |
| 2,689,978 | 9/1954 | Roger | 425/450 |
| 3,588,957 | 6/1971 | Schwartz | 425/242 X |
| 3,270,372 | 9/1966 | Hesse | 425/450 |
| 3,669,599 | 6/1972 | Snider et al. | 425/450 X |
| 3,603,248 | 9/1971 | Nouel | 425/DIG. 223 |
| 3,528,134 | 9/1970 | Fischbach | 425/DIG. 223 |
| 2,718,662 | 9/1955 | Bohannon et al. | 425/450 |

Primary Examiner—J. Spencer Overholser
Assistant Examiner—David S. Safran
Attorney—Roy A. Plant et al.

[57] ABSTRACT

An apparatus for pressure molding or casting comprising a plurality of strain rods and having an adjustable fixed back plate mounted at one end of said rods, a fixed platen at the other end, and a movable platen slidably mounted over the rods intermediate the fixed plate and fixed platen, the movable platen and fixed plate being adapted to support the halves of a mold. A pair of cylinder and piston combinations are coaxially mounted on the adjustable fixed back plate, one arranged to provide rapid reciprocal motion of the movable platen, and the other arranged to provide a large clamping force or tonnage. Means is provided for transmitting the clamping force or tonnage to the movable platen comprising a plurality of compression or stress rods affixed at one end to the movable platen, and a rotatable lock plate mounted on the adjustable fixed back plate adapted in one rotative position to engage the free ends of the compression rods and in another to permit the stress rods to pass therethrough.

6 Claims, 10 Drawing Figures

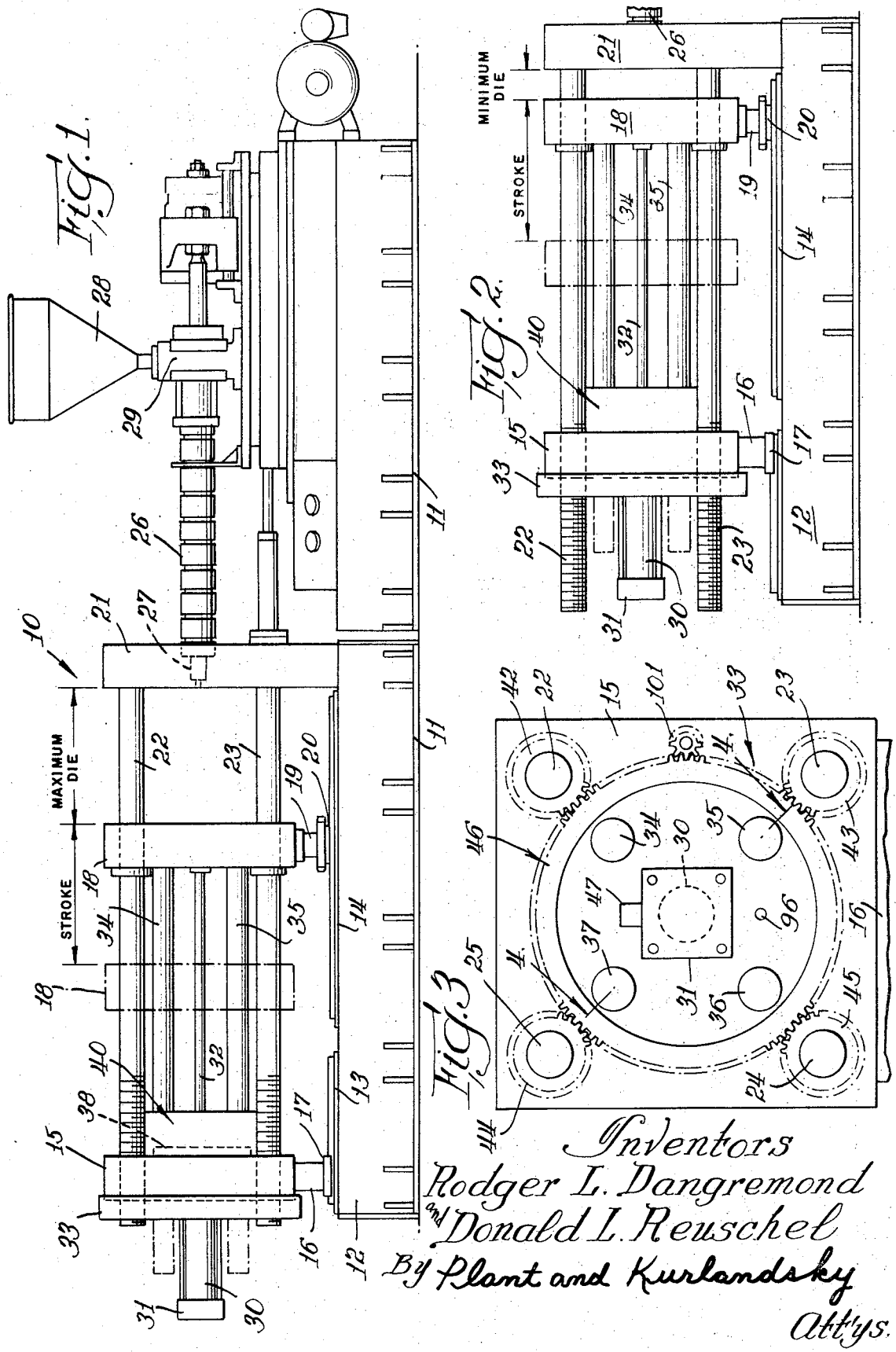

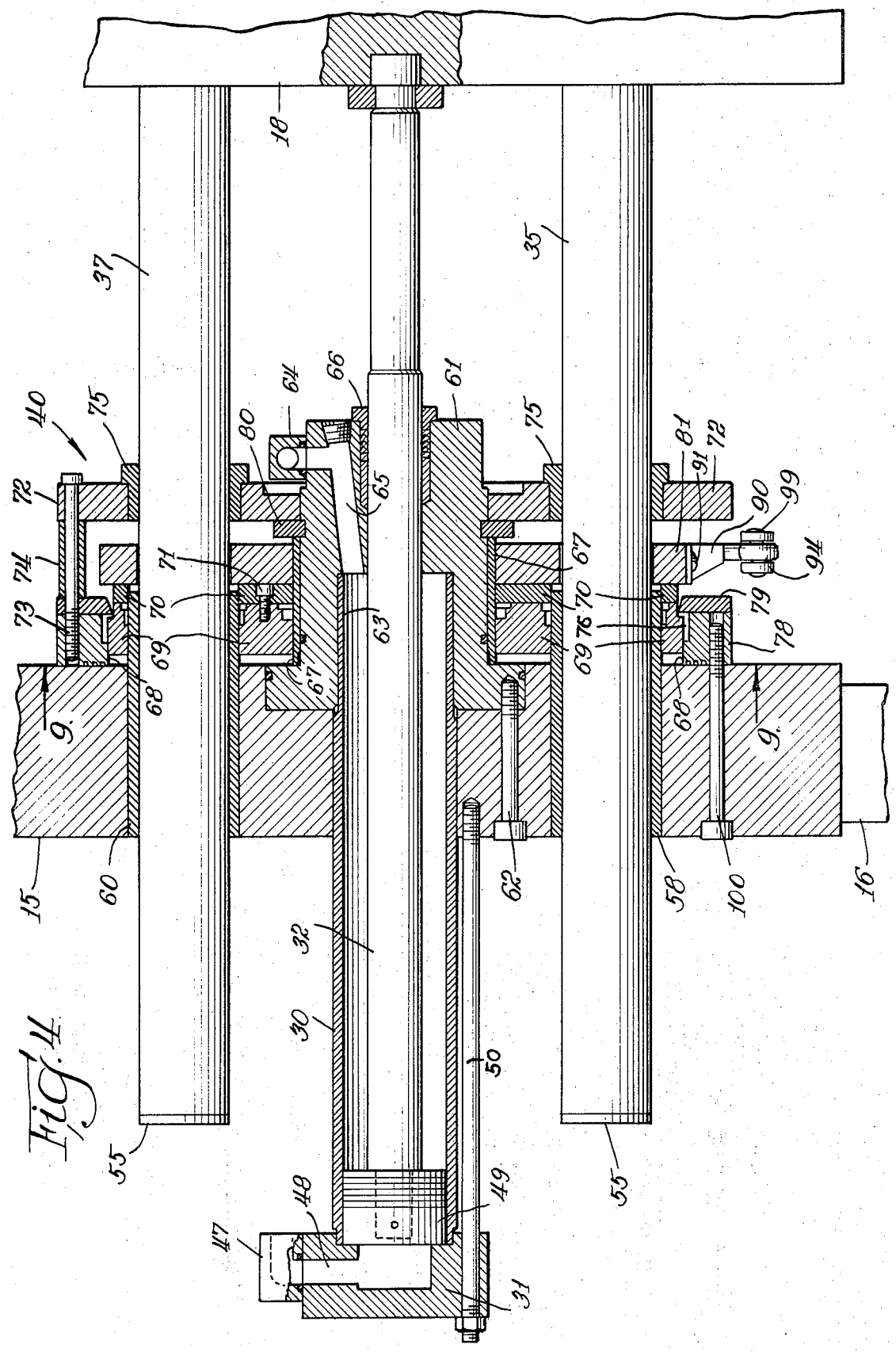

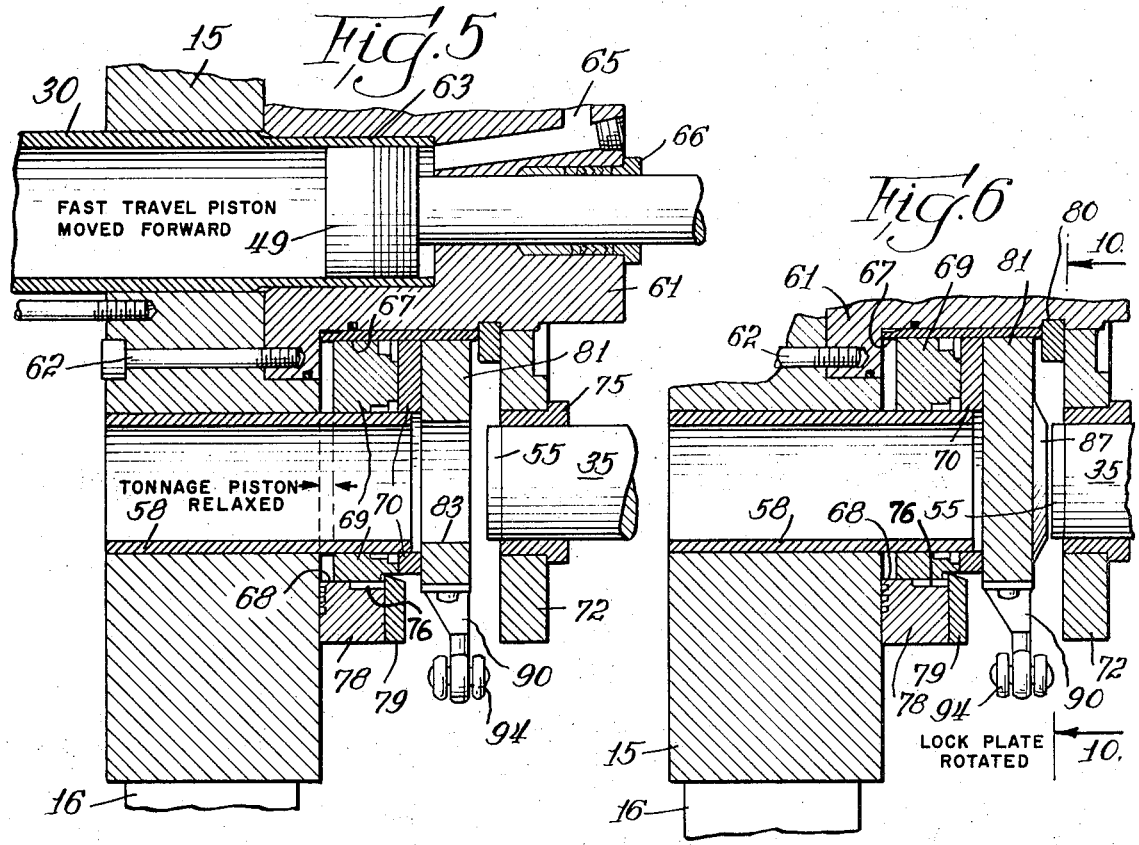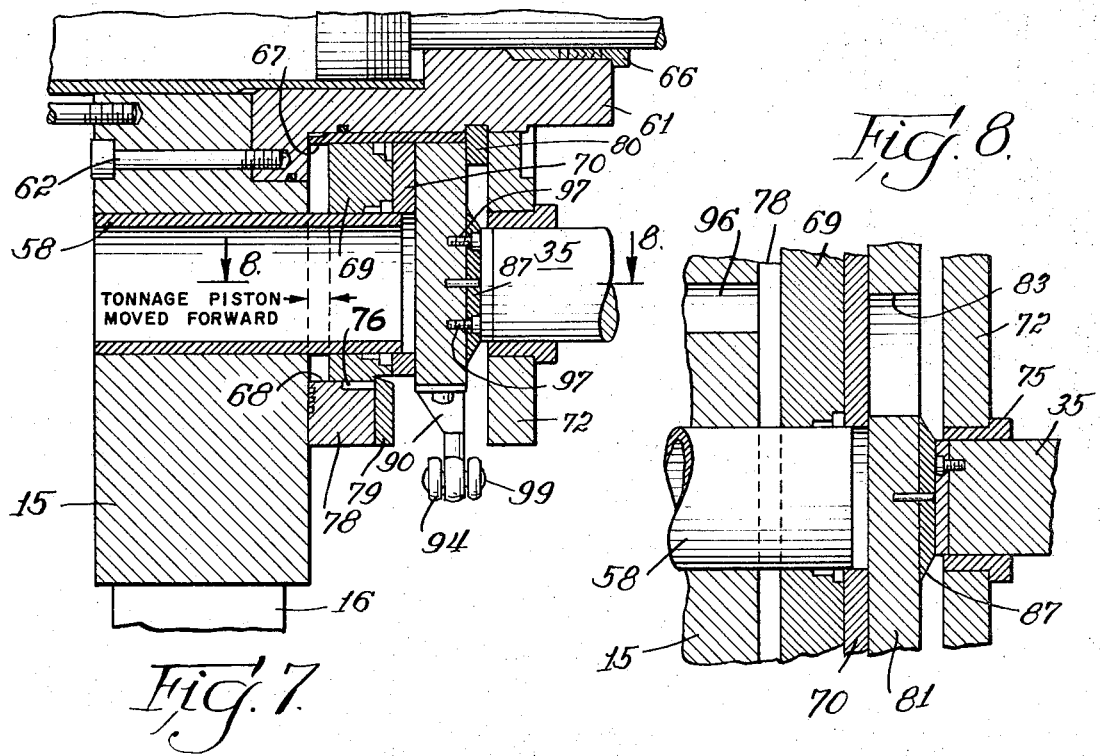

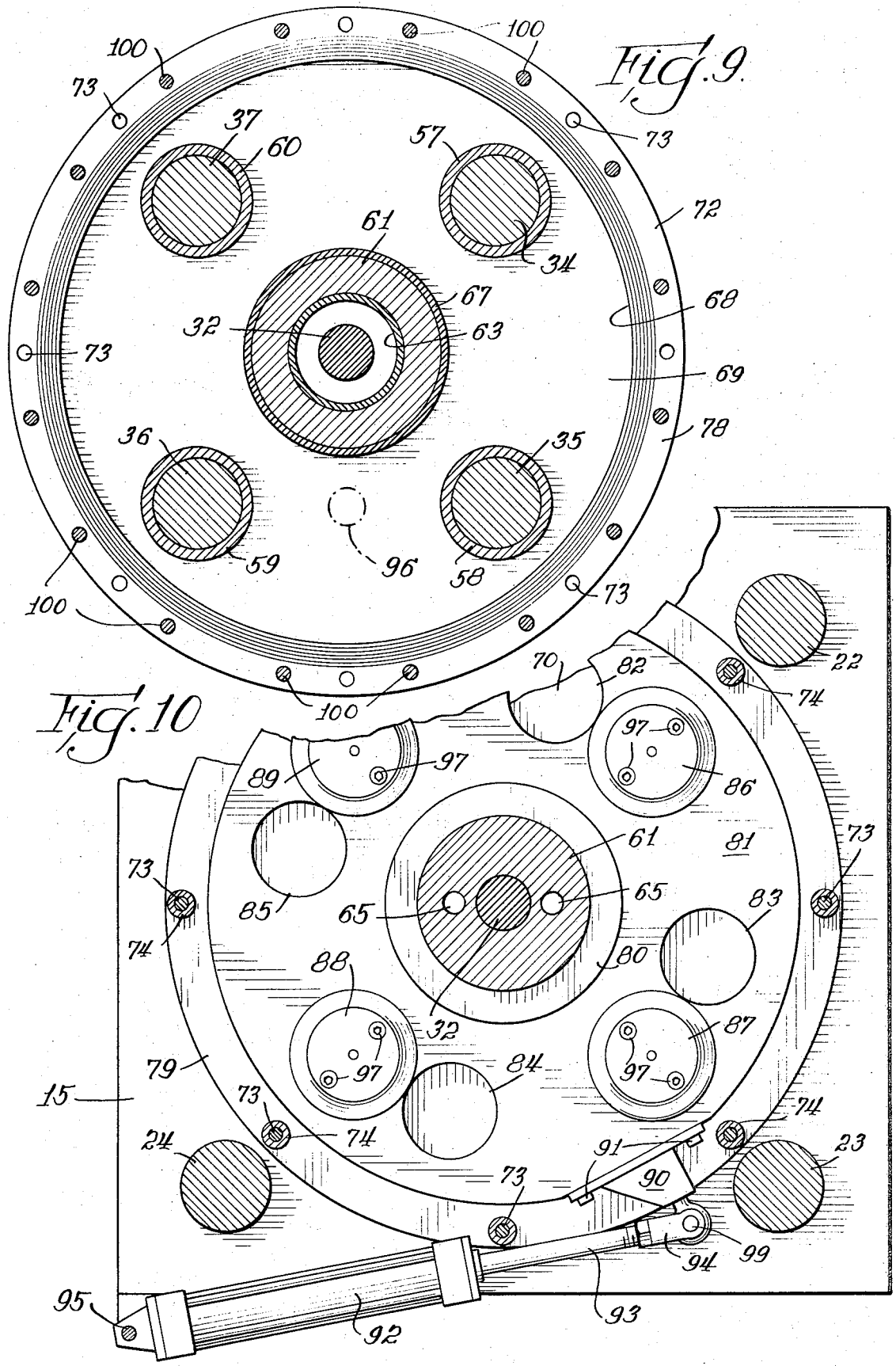

CLAMPING APPARATUS FOR MOLDING MACHINE

BACKGROUND OF THE INVENTION

The invention relates to an apparatus or machine for use in molding or casting, as for example for use in injection molding utilizing molds or dies comprised of separable members, and more specifically refers to a machine or the type described having improved means for applying tonnage force for compressing the mold members, and improved means for transmitting the tonnage force to the movable platen of the apparatus.

Machines of the present type designed for clamping the members of a mold for molding or casting are generally of two types, depending upon the means utilized for developing and applying the clamping force or tonnage. One type is the mechanical type utilizing mechanical means for developing extremely large forces required for clamping. The most common form of the mechanical type utilizes a toggle mechanism which develops large forces through an arrangement of levers. The toggle-type clamp is fast-acting, provides instantaneous lockup at the end of the stroke which brings the mold parts together, and provides rapid separation of the molds after the molding process is complete. The toggle-type also has lower initial cost and in some cases lower operating cost. For operations of smaller molding machines, that is utilizing clamping forces of up to 300 tons, the toggle-type has been most popular. However, in the case of larger machines where clamping forces or tonnage of from 450 to 2700 tons are required, the toggle-type of machine has not been found to be satisfactory because of the need for longer stroke. For machines requiring such higher clamping forces and longer stroke, the hydraulic type of machine is generally utilized. Such machines comprise generally a small cylinder for providing large movement of the movable platen for closing the mold, and a second cylinder of larger diameter for providing the large clamping force or tonnage. The various hydraulic types of molding machines disclosed in the art have been successful in providing the desired clamping tonnage, but have several disadvantages. First, they are relatively slow acting. Second, they generally require a large volume of oil for operating the tonnage cylinder. This is particularly objectionable when deep draw dies are utilized requiring a long stroke clamping apparatus.

SUMMARY OF THE INVENTION

Accordingly, it is an object of the present invention to provide a hydraulically operated apparatus for clamping molds and dies utilized for molding or casting plastic materials or metals, capable of providing large clamping tonnage.

It is another object to provide an apparatus of the type described which utilizes only a small amount of hydraulic fluid for operating the tonnage cylinder.

It is still another object of the invention to provide improved means for operating the movable platen of an apparatus having a long stroke so that the apparatus may be utilized with deep draw molds.

It is still an additional object to provide an apparatus providing high-speed reciprocal travel of the movable platen.

It is still another object to provide an apparatus of the type described having an improved quick-acting structure for transmitting tonnage force to the movable platen, and for providing rapid release of the clamping tonnage and withdrawal of the movable platen after the molding operation is complete.

It is still another object of the invention to provide an apparatus of the type described capable of offering reliable high precision operation with relatively little maintenance over extended periods of time.

It is still another object to provide an apparatus of the type described which is less expensive to build and operate than comparable equipment presently utilized in the art.

Still further objects and advantages of the invention will appear as the description proceeds.

To the accomplishment of the foregoing and related ends, the invention, then, consists of the useful apparatus herein fully described and particularly pointed out in the claims, the annexed drawings, and the following description setting forth in detail a certain illustrative embodiment of the invention, such disclosed embodiment illustrating, however, but one of the various ways in which the principle of the invention may be used.

BRIEF DESCRIPTION OF THE DRAWINGS

In the annexed drawings:

FIG. 1 is a side elevational view of the apparatus of the invention additionally showing an injection molding apparatus used in conjunction therewith, the platens being positioned for maximum die size.

FIG. 2 is a side elevational view showing the apparatus of the present invention, but excluding the injection molding apparatus, the platens being shown arranged for minimum die size.

FIG. 3 is a left end view of the apparatus shown in FIGS. 1 and 2.

FIG. 4 is a sectional view showing the apparatus in retracted position and taken at the line 4—4 of FIG. 3, looking in the direction of the arrows.

FIG. 5 is a fragmentary sectional view similar to that of FIG. 4, but showing the fast travel cylinder expanded.

FIG. 6 is a fragmentary sectional view similar to that of FIG. 5, but having the lock plate indexed.

FIG. 7 is a fragmentary cross-sectional view similar to that of FIG. 5, but showing the tonnage cylinder expanded.

FIG. 8 is a sectional view taken at the line 8—8 of FIG. 7, looking in the direction of the arrows, showing a pressure pad adjacent to a stress rod clearance hole.

FIG. 9 is a sectional view taken at the line 9—9 of FIG. 4, looking in the direction of the arrows, and showing the annular shape of the tonnage cylinder; and FIG. 10 is a sectional view taken at the line 10—10 of FIG. 6, looking in the direction of the arrows, and showing the lock plate indexing cylinder.

DESCRIPTION OF THE SPECIFIC EMBODIMENT

Referring more particularly to FIGS. 1 and 2, the apparatus of the present invention 10 comprises a base 11 and a base platform 12 having mounted thereon fixed ways 13 and 14. A back plate 15 having a moving base 16 is provided with a track 17 engaging a way 13. A movable platen 18 is mounted on a traveling base 19 and provided with an engaging track 20 engaging ways 14. A stationary platen 21 is mounted on the base platform 12. A plurality of strain or tie rods 22, 23, 24 and 25 are each affixed at one end to the stationary platen 21. The other ends of the strain rods are slidably positioned in channels provided in the back plate 15 A molding material feed tube 26 of the injection molding machine is provided with a nozzle 27 which extends into a complementary receptacle provided in the stationary platen 21. The molding machine shown generally additionally has a hopper 28 and an extruder 29.

Mounted on the back plate 15 is a fast-acting cylinder 30 having a terminal cap 31, and a piston rod 32 engaging the movable platen 18. The threaded ends of the strain rods 22, 23, 24 and 25 which extend through the back plate 15 are engaged by a rotary adjustment unit 33. Stress or compression rods 34, 35, 36 and 37 are each affixed at one end to the movable platen 18 and have their other ends extending in the direction of the back plate 15. A tonnage piston and cylinder assembly 38 is mounted on the forward portion of the back plate 15 having a lock plate and tonnage assembly 40 mounted immediately in front of the tonnage piston and cylinder assembly 38.

Referring to FIG. 3, the device for adjusting the position of the back plate 15 is illustrated and comprises a plurality of nuts 42, 43, 44 and 45 having peripheral gear teeth provided thereon, and an annular gear 46 having peripheral teeth meshed with the teeth of the nuts 42–45. Adjustment of the position of the back plate 15 is accomplished by rotating the annular gear 46 through drive gear 101.

Referring specifically to FIG. 4, the fast-acting cylinder 30 is shown in greater detail and comprises, in addition to the cylinder 30, cap 31 and piston rod 32, an elbow 47 having a passage 48 for passage of hydraulic fluid. Additionally, a piston is contained within the cylinder 30 affixed to the piston rod 32. A plurality of bolts 50 mount the cylinder to the back plate 15. Additionally shown in FIG. 4 are wear caps 55 affixed to the ends of the stress rods 34–37. The stress rods are slidably journaled in sleeves 57, 58, 59 and 60 (FIG. 9) to prevent wear, to facilitate sliding when the movable platen is moved and to provide sealing of the hydraulic fluid.

Referring to FIGS. 4, 5, 6, and 7, a supporting hub 61 is affixed to the back plate 15 by means of bolts 62. A bore is provided receiving the reduced end 63 of the cylinder wall 30. An elbow 64 is mounted on the supporting hub 61 having a passageway 65 for passage of hydraulic fluid to provide for return of the fast travel cylinder. A packing gland 66 provides a seal for the fast travel cylinder.

Referring to FIGS. 4–9, the annular shaped tonnage cylinder and piston are shown. The inner cylinder wall 67 is a sleeve mounted over the supporting hub 61 (FIG. 9). The outer cylinder wall 68 comprises the inner surface of a cylinder 78 mounted on the fixed plate 15 by means of screws 100. The front wall of the back plate 15 serves as the rear wall of the tonnage cylinder. The tonnage piston 69 (FIGS. 4–9) is slidably mounted in the tonnage cylinder 78. It engages the outer cylinder wall 68, the inner cylinder wall 67 and the outer surfaces of the sleeves 57–60. A tonnage piston cap 70 is mounted on the forward surface of the tonnage piston 69 by means of bolts 71. A hanger plate 72 is mounted on the fixed plate 15 by means of bolts 73, the spacers 74. The hanger plate supports the ends of the stress rods 34, 35, 36 and 37 in the clamping position. Sleeves 75 are mounted in apertures provided in the hanger plate providing supporting seals for the stress rods. An outer retainer ring 79 is mounted on the tonnage cylinder 78 by means of the bolts 73 and spacers 74, providing a limit position for the tonnage piston 69 by engaging a shoulder 76 thereof. An inner retainer 80 engages and restrains the inner cylinder wall 67 of the tonnage cylinder.

Rotatably mounted over the inner cylinder wall 67 is a lock plate 81 having clearance holes 82, 83, 84 and 85 for receiving the ends of the stress rods 34–37. Adjacent to the clearance holes are pressure pads 86, 87, 88 and 89 affixed to the lock plate 81 by means of bolts 97. A bracket 90 is affixed to a flattened portion of the lock plate 81 by means of bolts 91. A hydraulic cylinder 92 is provided with a piston rod 93 which is pivotally affixed to the bracket 90 by means of a clevis 94 and pin 99. A flexible anchor 95 pivotally connects the cylinder 92 to the back plate structure. The cylinder, piston and rod arrangement for rotating the lock plate must be mounted on a flexible joint, as for example a ball joint, since during operation the lock plate moves axially forwardly and rearwardly by a small amount. The structure may additionally be rubber mounted to provide the small necessary movement.

ADJUSTMENT OF THE APPARATUS FOR OPERATION

To set up the apparatus of the invention for normal operation, the fast travel cylinder 30 may be actuated for completely withdrawing the movable platen 18. The mold halves are then mounted on the movable platen 18 and the fixed plate 21. The fast-acting cylinder 30 is then actuated to move the movable platen toward the stationary platen until the piston 49 of the fast-acting cylinder 30 is fully extended. The cylinder 92 is actuated to rotate the lock plate 81 to the position in which the pressure pads 86–89 are disposed immediately behind the wear caps 55 of the stress rods 34–37. The annular gear 46 is then rotated, moving the back plate 15 forwardly until the two halves of the mold are substantially in contact engagement or is desired, have only a small clearance between them. The lock plate 81 is then rotated by actuation of the cylinder 92 to the unlocked position in which the clearance holes 82–85 are in register immediately behind the stress rods 34–37. The fast-acting cylinder 30 is then actuated and the movable platen 18 is retracted to its rearwardmost position. The nozzle 27 of the injection molding machine is then inserted into the receptacle provided in the stationary platen 21, and the machine is ready for operation.

OPERATION OF THE APPARATUS

Operation of the apparatus is normally controlled by automatic sequencing and timing devices which may be electrically, electronically, or even fluidically operated. Since such timing and sequencing devices are well known in the art, they will not be described herein.

Operation begins with the fast travel piston 49 in the position shown in FIG. 4, and with the movable platen 18 in its rearwardmost position. The operation cycle, which is controlled by automatic timing devices known in the art as referred to above, begins with the actuation of the fast-acting cylinder 30 causing the piston 49 to move forwardly to its furthermost position, through a stroke of about 40 inches. The apparatus at this point is in the position shown in FIG. 5 with the piston 49 forwardly disposed and the wear caps 55 of the stress rods 34–37 removed from the sleeves 57–60 and positioned in advance of the lock plate 81. The cylinder 92 is then actuated causing the lock plate 81 to rotate and to assume the position shown in FIG. 6 wherein the pressure pads 86-89 are positioned immediately behind the wear caps 55 of the stress rods 34-37. At this point there is a small clearance between the pressure pads and the wear caps 55. Hydraulic fluid under pressure is then applied to the tonnage cylinder 78 through a tonnage oil inlet 96 shown in FIG. 8. This causes the tonnage piston 69 to move forward to the position shown in FIGS. 7 and 8. In order to utilize as little hydraulic fluid as possible in moving the tonnage piston, the stroke of the piston may be designed to be ¾ inch or less, and even shorter strokes such as ⅜ inch or less are feasible. The apparatus described herein and illustrated in the drawings has been successfully operated at a tonnage force of about 650 tons. However, apparatus of the type described may be properly designed to provide clamping tonnage having values far less or in excess of 650 tons, by decreasing or increasing the area of the tonnage cylinder and piston.

When full tonnage force has been attained, molten material from the injection end of the machine is injected under high pressure through the fixed platen 21 and into the mold maintained between the movable platen 18 and fixed platen 21. After the mold has been filled, tonnage is maintained until the material has sufficiently solidified. Then cylinder 69 is decompressed by removing oil through inlet 96 and then the cylinder 92 is free to rotate the lock plate 81 and to place the ends of the stress rods 34-37 in registry with the clearance holes 82-85 of the sleeves 57-60. The fast-acting cylinder 30 is then actuated and the movable platen 18 retracted and returned to its rest position, thereby opening the mold members and permitting the molded piece to be removed. The apparatus is now ready to start another cycle with the fast-acting cylinder 30 being actuated to extend the movable platen until the mold members mate again. The lock plate 81 is then rotated to bring the pressure pads 86-89 once more in registry with the ends of the stress rods 34-37 and the entire cycle repeated.

It will be seen that the tonnage cylinder 78 is single acting, that is, no provision is made for the introduction of hydraulic fluid in front of the piston to return it to its rearward position. Consequently, after the lock plate is rotated and opened, the tonnage piston 69 remains in place. As a result, in a succeeding cycle when the movable platen 18 is returned to the position in which the mold members meet, because the engaging surfaces of the pressure pads 86-89 and the stress rods 34-37 are convexly shaped, as the lock plate rotates engagement between the pressure pads and stress rods may cause the stress rods to move forward a small amount and to cause the mold members to kiss. This can be avoided by a modification of the procedure described above in carrying out the molding cycle. In the modified procedure, after the piece has solidified, instead of immediately rotating the lock plate 81 to release the movable platen 18, the fast-acting cylinder 30 is actuated while the lock plate 81 is still in locked position. This causes the stress rods to apply force against the pressure pads 86-89. The lock plate in turn bears against the tonnage piston cap 70 and tonnage piston 69, forcing the tonnage piston to return to its retracted position. The lock plate 81 is then rotated and the movable platen 18 returned to its retracted position. When in the following cycle, the movable platen is returned to its forward position and the lock plate rotated to locked position, a clearance between the pressure pads 86-89 and wear caps 55 of the stress rods 34-37 remains, as shown in FIG. 6, thereby avoiding premature engagement of the stress rods with the pressure pads and with the result that kissing of the mold members is prevented.

The present apparatus designed to be operated in conjunction with molding machines for clamping mold members has many advantages over prior art machines designed for the same purpose. First of all, it has the advantage of most hydraulically operated machines, that extremely large tonnage forces can be generated. Further, it has a number of advantages over hydraulically operated machines used in the art in that it provides a small quick-acting cylinder to provide a long stroke to be used for the molding of deep draw parts. However, it avoids the common deficiencies of prior art hydraulic machines in that the present invention utilizes a tonnage cylinder having an extremely short stroke, as low as ⅜ inch or less. Consequently, it takes only a relatively small amount of hydraulic fluid to stroke the piston. Moreover, the piston may be stroked in a very short period of time. This arrangement avoids the bulky and slow-acting tonnage cylinders of the prior art in which the entire stroke of the tonnage cylinder may be as great as 40 inches or more, thereby requiring the pumping of a large amount of hydraulic fluid. The present invention has an additional advantage in that it provides a novel rotatably mounted lock plate cooperating with a plurality of stress rods affixed to the movable platen for rapidly and positively locking the apparatus and providing a positive transmission of the tonnage force from the tonnage cylinder to the movable platen. A further advantage of the present apparatus is that it is relatively compact since it does not require large bulky hydraulic fluid storage tanks, and does not require bulky locking devices. The apparatus may be constructed from readily available materials and is not unduly expensive.

While but one form of the invention has been shown and described, other forms within the spirit and scope of the invention will now be apparent to those skilled in the art. Therefore, the embodiment shown in the drawings is to be considered as merely setting forth the invention for illustrative prupuses, and is not intended to limit the scope of the invention herein described and shown.

The embodiments of the invention in which an exclusive property or privilege is claimed are defined as follows:

1. An apparatus for use in molding or casting and adapted to support and clamp together the mold members of a mold comprising:
   1. a frame,
   2. a pair of platens adapted to support said mold members including,
      a. a fixed platen affixed at one end of said frame, and
      b. a movable platen slidably mounted on a medial portion of said frame,
   3. a back plate adjustably affixed to said frame at the other end thereof,
   4. means for providing rapid reciprocal movement of said movable platen between an advanced position of mold closure and a retracted position of mold opening comprising a fast-acting cylinder having a piston mounted therein for reciprocal movement of relatively small bore and of relatively long stroke mounted on said back plate and having a piston rod the remote end of which is affixed to said movable platen, 5. means for providing a high tonnage clamping force comprising a tonnage cylinder mounted on said back plate coaxially positioned with respect to said fast-acting cylinder and having a piston reciprocably mounted therein, said cylinder having a bore of large cross-sectional area and a stroke of relatively short travel; and 6. means for transmitting tonnage clamping force from said tonnage cylinder to said movable platen comprising a plurality of stress rods each affixed at one end to said movable platen and extending in parallel relationship in the direction of said back plate, said back plate and said tonnage cylinder and piston being provided with apertures having seals therein permitting said stress rods to pass therethrough, and a lock plate rotatably mounted on said back plate and means for rotating said lock plate alternatively to one of two indexing positions, said lock plate having a plurality of apertures so arranged that when said lock plate is in the open index position the ends of said stress rods may pass therethrough, and when said lock plate is rotated to the closed index position, the ends of said stress rods engage said lock plate and force transmitted from said tonnage piston to said lock plate is in turn transmitted to said stress rods.

2. An apparatus according to claim 1 wherein metal disc form pressure pads are mounted on said lock plate and adapted to engage the ends of said stress rods when said lock plate is in the closed index position.

3. An apparatus according to claim 2, wherein the ends of said stress rods are provided with wear caps.

4. An apparatus according to claim 1, wherein a hanger plate is mounted on said back plate having apertures provided therein for supporting said stress rods.

5. In an apparatus for use in molding or casting and adapted to support and clamp together the mold members of a mold, comprising an elongate frame, a fixed platen mounted at one end of said frame, a movable platen slidably mounted in a medial portion of said frame, a back plate adjustably affixed to said frame at the other end thereof, and a tonnage cylinder mounted on said back plate having a piston reciprocably mounted therein, the improvement therein comprising means for transmitting tonnage clamping force from said tonnage piston to said movable platen comprising a plurality of stress rods each affixed at one end to said movable platen and extending in parallel relationship in the direction of said back plate, said back plate and said tonnage cylinder and piston being provided with apertures having seals therein permitting said stress rods to pass therethrough, and a lock plate rotatably mounted on said back plate and adapted to be engaged by said tonnage piston, having a plurality of apertures so arranged that when said lock plate is in the open index position the ends of said stress rods may pass therethrough, and when said lock plate is rotated to the closed index position the ends of said stress rods engage said lock plate and force transmitted from said tonnage piston through said lock plate is in turn transmitted to said stress rods and said movable platen.

6. An apparatus according to claim 5, wherein said rotatable lock plate is provided with a hydraulic cylinder for rotating said plate.

* * * * *